(12) United States Patent
Patel

(10) Patent No.: US 8,763,934 B2
(45) Date of Patent: Jul. 1, 2014

(54) NON PRESSURE COMPENSATED DRIP IRRIGATION EMITTER WITH MULTIFLOW FACILITY

(76) Inventor: Parixit Amrutbhai Patel, Ahmedabad (IN)

( * ) Notice: Subject to any disclaimer, the term of this patent is extended or adjusted under 35 U.S.C. 154(b) by 334 days.

(21) Appl. No.: 13/388,920

(22) PCT Filed: Feb. 1, 2011

(86) PCT No.: PCT/IN2011/000072
§ 371 (c)(1),
(2), (4) Date: Feb. 3, 2012

(87) PCT Pub. No.: WO2011/104722
PCT Pub. Date: Sep. 1, 2011

(65) Prior Publication Data
US 2012/0126036 A1    May 24, 2012

(30) Foreign Application Priority Data
Feb. 3, 2010   (IN) .......................... 274/MUM/2010

(51) Int. Cl.
*B05B 15/00*    (2006.01)
(52) U.S. Cl.
USPC ................... 239/542; 239/547; 239/533.1
(58) Field of Classification Search
CPC ...... A01G 25/023; A01G 25/06; F16K 23/00; B29C 45/1671
USPC ....................... 239/542, 547, 533.1
See application file for complete search history.

(56) References Cited

U.S. PATENT DOCUMENTS

| 6,817,548 B2* | 11/2004 | Krauth .......................... 239/542 |
| 6,945,476 B2 | 9/2005 | Giuffre |
| 7,108,205 B1 | 9/2006 | Hashimshony et al. |
| 7,988,076 B2* | 8/2011 | Mamo ........................ 239/542 |
| 8,096,491 B2* | 1/2012 | Lutzki et al. ................. 239/542 |
| 2010/0096478 A1 | 4/2010 | Mamo |

FOREIGN PATENT DOCUMENTS

WO    WO 03/045131    6/2003

OTHER PUBLICATIONS

International Search Report and Written Opinion, issued in PCT/IN2011/000072, dated Sep. 30, 2011, 9 pages.

* cited by examiner

*Primary Examiner* — Dinh Q Nguyen
(74) *Attorney, Agent, or Firm* — Klarquist Sparkman, LLP

(57) ABSTRACT

Described is a non pressure compensated drip emitter with multiflow facility, the drip emitter being placed inside a pipe of a drip irrigation system, the drip emitter comprising: a housing; a filter system being fitted at each inlet to ensure pure supply of water inside the emitter; three pools of water from only one of which water get discharged out of emitter and from emitter to the land to be irrigated, the third pool in the middle; a labyrinth in fluid communication with each pool and the filter system, the labyrinth comprises zigzag water paths; wherein the labyrinth connects middle pool with remaining two pools through the zigzag water path in such a way that even in case of partial clogging of the zigzag water path, the remaining partial zigzag water path remain active and ensure the discharge of water at a selected flow rate from the emitter.

7 Claims, 5 Drawing Sheets

NON PRESSURE COMPENSATED DRIP IRRIGATION EMITTER WITH MULTIFLOW FACILITY

CROSS REFERENCE TO RELATED APPLICATIONS

This is the U.S. National Stage of International Application No. PCT/IN2011/000072 filed Feb. 1, 2011, which was published in English under PCT Article 21(2), which in turn claims the benefit of Indian Application No. 274/MUM/2010, filed Feb. 3, 2010. Both applications are hereby incorporated by reference herein in their entirety.

FIELD OF THE INVENTION

The present invention generally relates to drip irrigation equipment. More particularly it relates to a drip irrigation emitter and most specifically it relates to a non pressure compensated drip irrigation emitter with multiflow facility.

BACKGROUND OF THE INVENTION

Irrigation is pouring water to the soil using proper methods and in proper times as required by the plant growth as a result of insufficient rain. The success of irrigation depends on the selection of the most proper irrigation method as per the conditions and planning, projecting, establishing and operating the irrigation system necessary for that method.

Irrigation methods are divided into two groups according to the features related with deliver and application of water on soil. These are surface irrigation and pressure irrigation methods.

In surface irrigation systems water is moving over the land by simple gravity flow in order to wet it and to infiltrate into the soil. With the application of water to the land surface does not always accomplish the intended purpose. Much of this water is lost due to evaporation, run-off, percolation passed the root zone and so on. They can be subdivided into furrow, border strip or basin irrigation. Surface irrigation systems are typically less efficient in applying water than pressure irrigation methods. Many are situated on lower lands with heavier soils and, therefore, tend to be more affected by water logging and soil salinity if adequate drainage is not provided. Surface systems tend to be labour-intensive. Another disadvantage of surface irrigation methods is the difficulty in applying light, frequent irrigations early and late in the growing season of several crops.

In the second method, pressure irrigation method, the water is given to soil by using closed pipe systems with an additional energy or a drawing effect. It is of two types one is sprinkler irrigation and other is drip irrigation.

In sprinkler irrigation the water is given to the soil surface under a little pressure and through laterally located sprinkler heads spraying thin drops. But there are many disadvantages associated with this kind of irrigation. Some of them are more usage of water compared to drip irrigation high cost of power, wind interferes with the distribution pattern and nozzle clogging.

In drip irrigation system, irrigation water necessary for plant growth is applied around the root of plant in the form of drops through specially designed tools named emitters/drippers located on or inside the lateral pipe. Each dripper/emitter, orifice supplies a measured, precisely controlled uniform application of water, nutrients, and other required growth substances directly into the root zone of the plant. The discharge flow rate of the emitters varies according to the need of the crop, types of soil and local weather condition.

There are multiple types of irrigation drippers/emitters. Emitters are classified into groups based on how their design type and the method they use to regulate pressure. A very simple emitter is created by drilling a very small hole in a pipe. However, a hole alone does not work well. Unless the hole is extremely small, the water tends to forcefully shoot out of it like a tiny fire nozzle and way too much water comes out. More importantly, there is little uniformity of flow when using a simple hole.

The emitters can be installed on the pipe and act as small throttles, assuring that a uniform rate of flow is emitted. Some are built into the pipe or tubing, others attach to it using a barb or threads. The emitter reduces and regulates the amount of water discharged.

Other categories of drip emitters include pressure compensated and non-pressure compensated. Pressure compensated emitters are designed to discharge water at a very uniform rate under a wide range of water pressure which is more expensive than the Non pressure compensated (Non PC) emitters and also not suitable for all types of drip irrigation systems.

Emitting pipe is very important component in drip irrigation system which distributes the water through emitter to plant. Performance of emitting pipe is totally depended on emitters and supplier's technical engineer is choosing emitter discharge during the design of any field/farm. Therefore accurate discharge emitter is the key component in entire drip irrigation system.

Generally the emitter comprises of a pressure reduction channel which is known as "labyrinth channel" more commonly known as "labyrinth". The labyrinth generally comprises a tortuous "obstacle" flow path that generates turbulence in water flowing in the labyrinth to reduce water pressure and discharge of water by the emitter.

Emitter clogging is one of the most important factors that affect the performances on drip irrigation systems. Emitter clogging, which is formed in a short time due to irrigation systems' running under an inadequate pressure or owing to water quality, not only negatively influences uniformity of water distribution but also causes inadequate irrigation. The small openings of the emitter can be easily clogged by soil particles, organic matter, bacterial slime, algae or chemical precipitates effects water and fertilizer uniformity, increase maintenance costs, and cause crop damage.

There are several drip irrigation systems including emitters are available in the art. Some of them are discussed herein below for reference.

The U.S. Pat. No. 7,108,205 discloses a drip irrigation system employing parallel adjacent flow paths in wherein a drip irrigation tube having a plurality of sequentially placed emitters formed on an interior wall of the tube. Each emitter employs a series of parallel flow paths axially positioned along the tube to provide for closer proximity of inlet ports to discharge chambers thereby providing for closer spacing of the emitters. Overlapping of the inlet portion of the sequentially positioned emitters with the outlet portion of any preceding emitter provides for even more compact positioning of the emitters along the tube.

Another US Pat. publication No. 20100096478 discloses a non-clogging non-pressure compensated drip emitter that utilizes one or more filters or one or more inwardly offset filters that have an inlet that projects inwardly toward a centerline of the hollow cylindrical emitter body and a labyrinth having only turbulent transfer zones after water enters the labyrinth, wherein the labyrinth couples the filter(s) or inwardly offset filter(s) to the pool. Prevents clogging by eliminating dead transfer zones where sediment can accumulate where no turbulence exists. Also prevents clogging when the filter is positioned downward as the inwardly offset filter rises above any sediment when the emitter is positioned in the field in this downward orientation. Also prevents clogging flat filter configurations that have filters offset radially, i.e., redundant filters per emitter.

U.S. Pat. No 6,945,476 discloses to a self-compensated drip irrigation emitter. The emitter of this invention is capable of always supplying a substantially constant flow within a range of pressures of a fluid flowing in a pipe, from very low to very high pressures. Furthermore, the emitter of the invention has such characteristics as to prevent any accidental and undesired clogging thereof by sediments or debris.

Disadvantages of Prior Art Drip Irrigation Systems Including Emitters are as Follow:

1. Available Single emitter for different discharge through multi outlet has following disadvantages:
   These types of emitters have single discharge from single outlet and double discharge from two outlets.
   These types of emitter have multi oriented inserting option.
   These types of emitters have separate flow path for single discharge which can allow clogging of one outlet.
   These emitters require two drilling within one emitter for higher or multiple discharge which increases complexicity of drilling vis-à-vis more initial cost. These types of emitters have high installation and maintenance cost.
2. Available non-clogging, non-pressure compensated drip emitter utilizes one or more filters to prevent clogging in the labyrinth. The water that enters the emitter also contains suspended soil particles which are not accurately filtered by the provided filters. This causes clogging into the labyrinth.
3. Available drip irrigation system uses Pressure compensated type emitter has higher initial investment costs and marginally higher operating costs compared to systems using non-pressure compensated emitters. To overcome the problem of clogging greater water filtration is generally required for these emitters.
4. The available emitters has to inserted unidirectional, which reduces the efficacy of the production of emitting pipes.

From above it is clear that the forgoing prior art emitters have various problems, mostly dealing with water pressure and water clogging in the labyrinth.

So, In view of the above, it is apparent that there is need of an improved portable Non pressure compensated, Non clogging, multi flow emitter with common labyrinth, which overcomes all the above-mentioned drawbacks.

OBJECTS OF THE INVENTION

The main object of the present invention is to provide a drip irrigation emitter which eliminates all deficiencies associated with the prior art emitters.

Another object of the invention is to provide a non pressure compensated drip irrigation emitter with multiflow facility.

Yet another object of the invention is to provide a non pressure compensated drip irrigation emitter which regulates the release of water more accurately and gives continuous flow of discharge even in case of partial clogging into the labyrinth.

Still another object of the invention is to provide a non pressure compensated drip irrigation emitter which has multi orientation insertion option.

Yet another object of the invention is to provide a non pressure compensated drip irrigation emitter which is placed inline into the emitting pipe so as to prevent it from damage by the applied load which in any case may by tractor or other instruments at work fields.

Yet another object of the invention is to provide a non pressure compensated drip irrigation emitter which is easy to design and very inexpensive.

Yet another object of the invention is to provide a non pressure compensated drip irrigation emitter which is easy to install.

SUMMARY OF THE INVENTION

Accordingly to achieve the aforesaid objects, the present invention provides a non pressure compensated drip emitter with multiflow facility, the drip emitter being placed inside a pipe of a drip irrigation system, the drip emitter comprising:
   a housing;
   at least two inlets through which water enter inside the emitter;
   a filter system being fitted at each inlet to ensure pure supply of water inside the emitter;
   three pools of water from only one of which water get discharged out of emitter and from emitter to the land to be irrigated via opening provided over periphery of the pipe of the drip irrigation system, the two pools out of three having the same capacity of discharging the water at a first flow rate and the said two pools are placed at the ends of the housing, the third pool is placed in the middle and having a capacity of discharging the water at a second flow rate, the second flow rate being greater than the first flow rate;
   a labyrinth in fluid communication with each pool and the filter system, the water entering through each inlet passes into labyrinth through respective filter system and from labyrinth to the outside of the pipe through one of the pool depending upon the selected flow rate of water, the labyrinth comprises a plurality of zigzag water paths; wherein the labyrinth connects middle pool with remaining two pools through the zigzag water path in such a way that even in case of partial clogging of the zigzag water path, the remaining partial zigzag water path remain active and ensure the discharge of water at a selected flow rate from the emitter.

According to an embodiment of the invention each pool comprises an opening depending upon discharge flow rate and the said opening of the pool is eccentric with the opening provided over periphery of the pipe of the drip irrigation system.

According to another embodiment of the invention emitter is placed inline inside the pipe of drip irrigation system. More specifically emitter is welded with inner wall of the pipe of the drip irrigation system.

According to yet another embodiment of the invention first flow rate is 2 LPH and second flow rate is 4 LPH.

According to another embodiment of the invention first flow rate is 4 LPH and second flow rate is 8 LPH.

The present invention also discloses a drip irrigation system equipped with a non compensated drip emitter of the present invention.

DETAILED DESCRIPTION OF THE INVENTION

Figure 1:
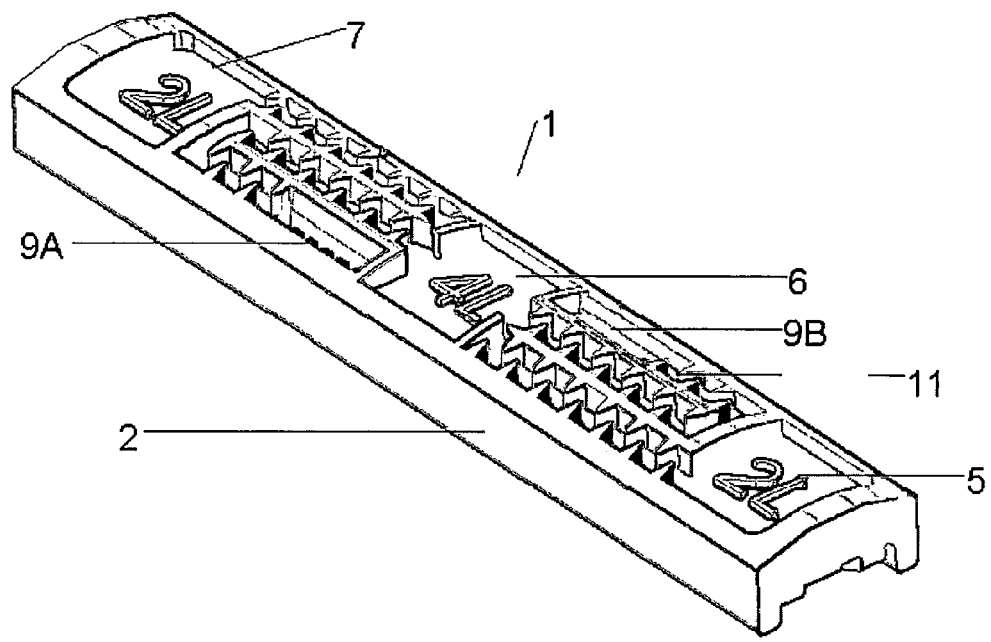
FIG. 1: shows a perspective view of a non pressure compensated drip emitter with multiflow facility in accordance to present invention.

The features, nature, and advantages of the disclosed subject matter will become more apparent from the detailed description set forth below when taken in conjunction with the drawings in which like reference numerals identify correspondingly throughout.

Referring to FIGS. 1 to 5, the non pressure compensated drip emitter (1) with multiflow facility comprises single outlet (10) for different discharge flow rate with two entry points (3, 4). The emitter mainly includes minimum two entry points (3, 4) for water with single outlet (10), filters (9A, 9B) at each entry points and a common labyrinth for flow of water (8A, 8B). The filters (9A, 9B) filter the coming water to emitter for minimizing clogging.

The emitter (1) includes three pools named $1^{st}$ pool (5), middle pool (6) and $3^{rd}$ pool (7) wherein the $1^{st}$ pool and $3^{rd}$ pool discharge same flow of water in droplets when either of them is punched. The middle pool (6) discharges different flow of water in droplets. The middle pool (6) discharges the water at greater flow rate as compared to $1^{st}$ pool and $3^{rd}$ pool (5, 7). According to one of the embodiments of the invention $1^{st}$ pool and $3^{rd}$ pool discharge water at flow rate of 2 LPH and middle pool (6) discharges water at flow rate of 4 LPH. Based on this principle, however, we can design an emitter. But the invention is not limited to 2 LPH and 4 LPH but it can be possible that $1^{st}$ pool and $3^{rd}$ pool (5, 7) could discharge water at flow rate of 4 LPH and middle pool (6) discharges water at flow rate of 8 LPH.

Figure 2:
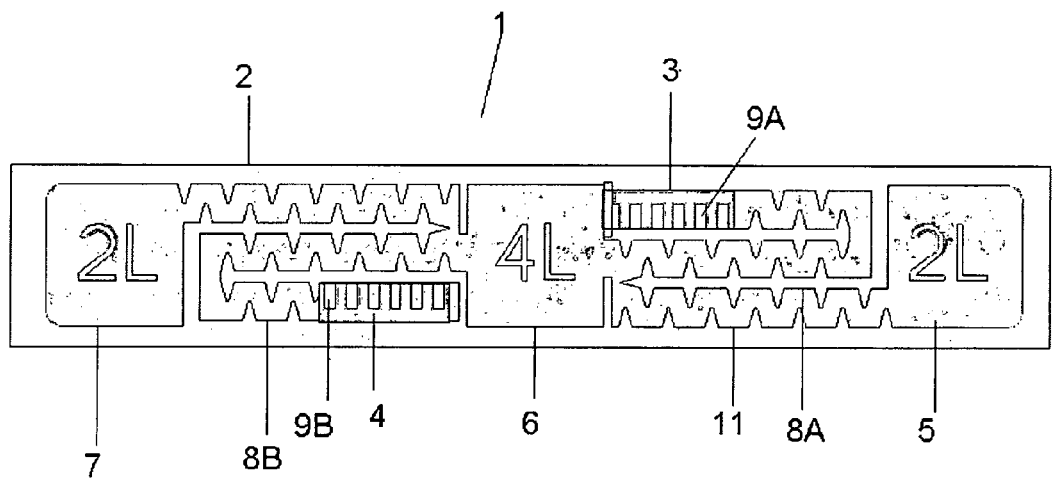
FIG. 2: Shows a top view of a non pressure compensated drip emitter with multiflow facility in accordance to present invention.
Figure 3A:
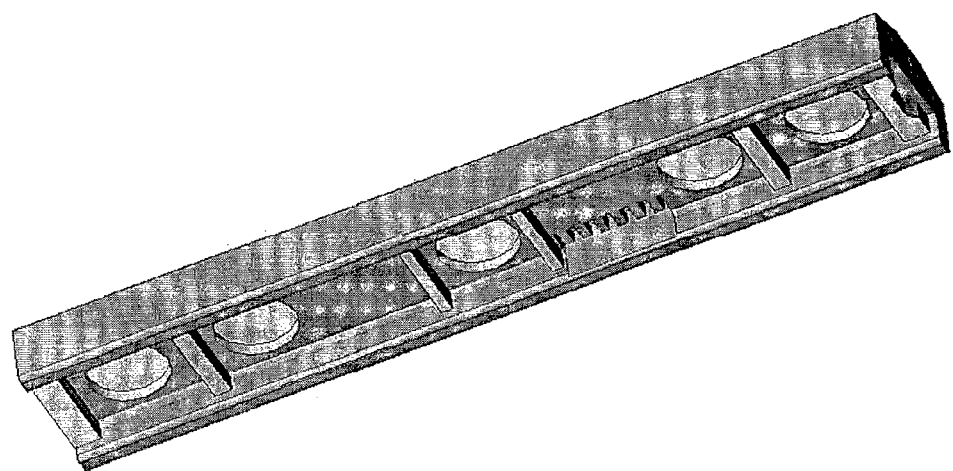
FIG. 3A & 3B: shows a bottom view of a non pressure compensated drip emitter with multiflow facility in accordance to present invention.
Figure 3B:
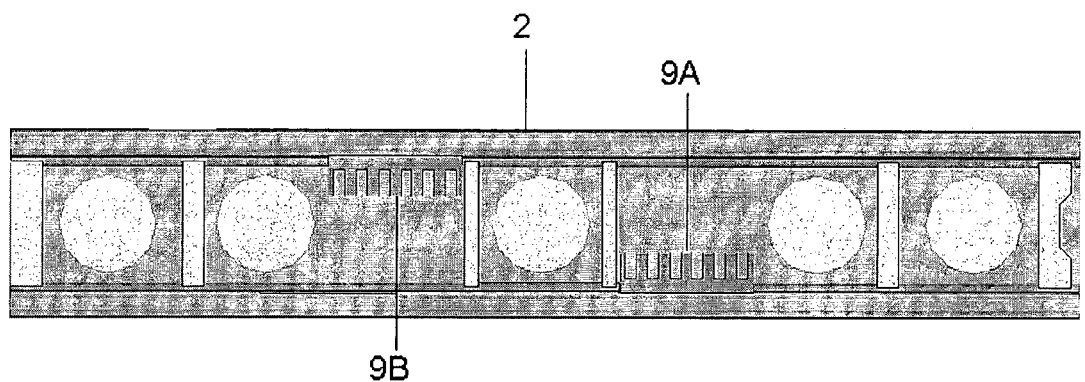
Figure 4:
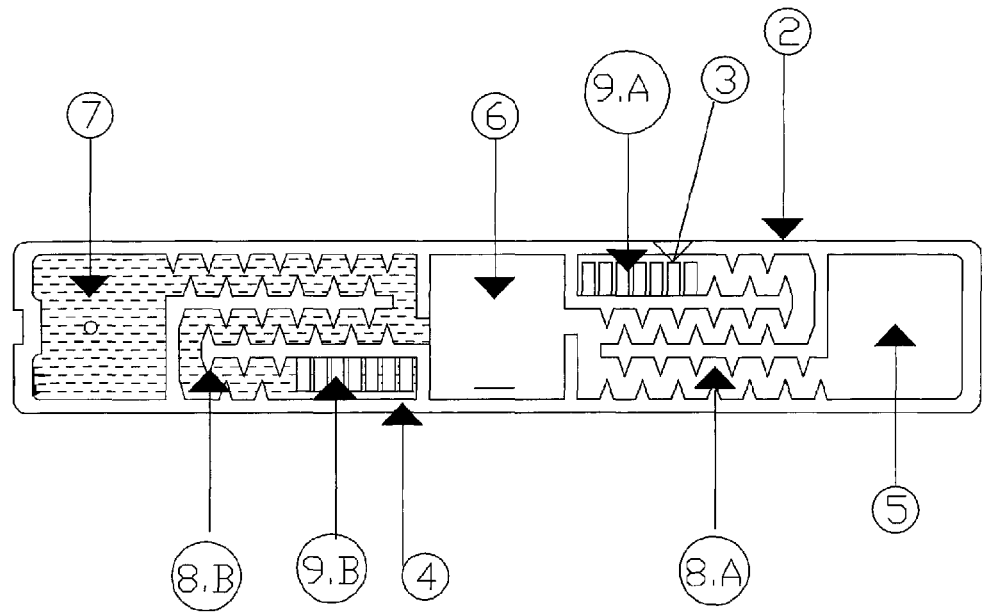
FIG. 4: shows a perspective view of the non pressure compensated drip emitter in which 2 LPH of water is discharged under normal condition.
Figure 5:
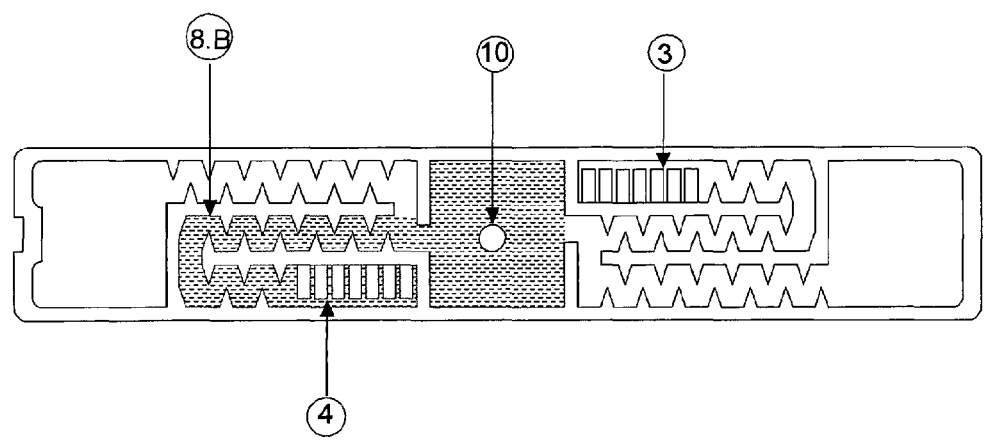
FIG. 5: shows a perspective view of the non pressure compensated drip emitter in which 4 LPH of water is discharged under normal condition.

The $1^{st}$ and $3^{rd}$ pools are connected to middle pool (6) through a common labyrinth (8A, 8B). As shown in FIG. 2, $1^{st}$ partial labyrinth (8A) and $2^{nd}$ partial labyrinths (8B) of common labyrinth channel connects $1^{st}$ and $3^{rd}$ pools (5, 7) respectively with middle pool (6). The common labyrinth (8A, 8B) comprises zigzag water paths (11). The zigzag water paths (11) creates turbulence by virtue of vortex/whirlpool movement of water reduces the pressure of water and thereby ensures the minimum clogging.

The emitter (1) is drilled at both the end to obtain desired/same flow of discharge so the emitter (1) can be inserted by any of its ends to select the direction of emitter (1). Thus, the emitter (1) gives continuous production of required flow rate depending on the requirement of the plant. The continuous production ensures nominal loss of material as well as man-hours thus gives efficient and economical results.

The emitter (1) is made of LLDPE & HDPE (EXTRUSION GRADE) material which is non-corrosive. It is inserted inline in the hot plasticized emitting pipe and welded with inner wall of the pipe of the drip irrigation system. In any case of farming by tractors or any other instruments, there are less chances of damaging the emitters installed in the emitting pipe. Yet the said emitters are placed in such a way so as to sustain the applied load by the said tractors or any other instruments, thus allows continuous irrigation efficiently.

Working of the Emitter of the Present Invention

The emitter (1) is installed inline in the emitting pipe of the drip irrigation system. The water from the supply line enters the emitter (1) through two entry points (3, 4) which further passes through the filters (9A, 9B), to the common labyrinth channel (8A, 8B), minimizing the clogging. The zigzag water path (11) of common labyrinth reduces the pressure of flowing water to the minimum and drip-out through the respective pools as per the requirement.

If the plant requirement is 2 LPH, either first pool (5) or third pool (7) of the emitter will discharge the required flow of the water when either of them is punched. And if the plant requirement is 4 LPH, middle pool (6) of the emitter will discharge the required flow of the water when the middle pool is punched.

The emitter (1) of the present invention supplies desired quantity of water and fertilizer directly to the root zone of plant even in case of clogging. The desired flow rate could be achieved even in case of clogging as shown in FIGS. 6A-6C and 7A-7B.

Figure 6A:
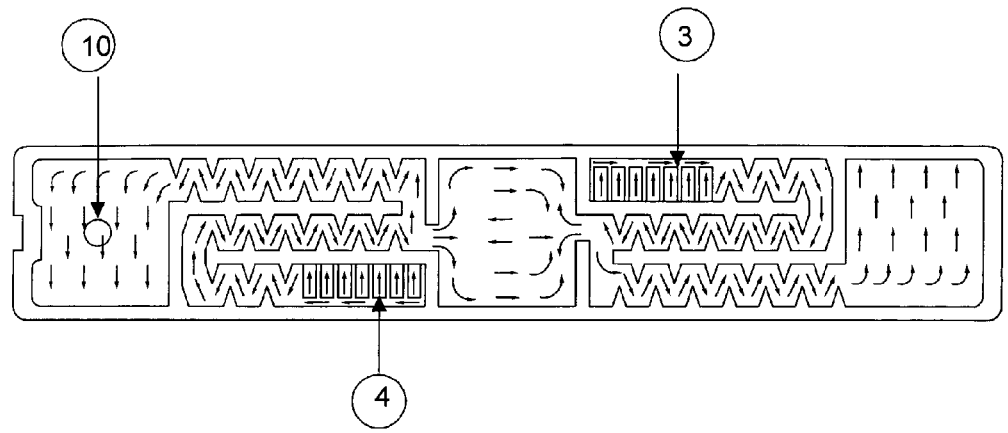
FIG. 6A: shows another view of the non pressure compensated drip emitter in which 2 LPH of water is discharged under normal condition.

FIG. 6A shows a diagram for 2 LPH water discharge under normal condition, in which water from the supply line enters the emitter (1) via two entry points (3, 4), passes into a common labyrinth (8A, 8B) through the respective filters (9A, 9B). The filters (9A, 9B) at each entry points (3, 4) filter the coming water to the emitter thus minimizing clogging. The water coming from the filter (9A, 9B) further passes through the common labyrinth (8A, 8B) to the exit point (10). The common labyrinth (8A, 8B) comprise of zigzag water path (11) creates turbulence by virtue of vortex/whirlpool movement of water, entering from the tube at a pressure of around 1 kg, further minimizing the possibility of clogging to the least. The zigzag water path (11) of the said common labyrinth (8A, 8B) also reduces the pressure of the flowing water. Thus, the water comes out of either of 1st pool (5) or $3^{rd}$ pool (7) in droplets, at 2 LPH used for drip irrigation when either of them is punched. The drills are made in the pool and the emitter pipe of the drip irrigation system as per the calculated water flow path to obtain 2 LPH discharge of flowing water.

Figure 6B:
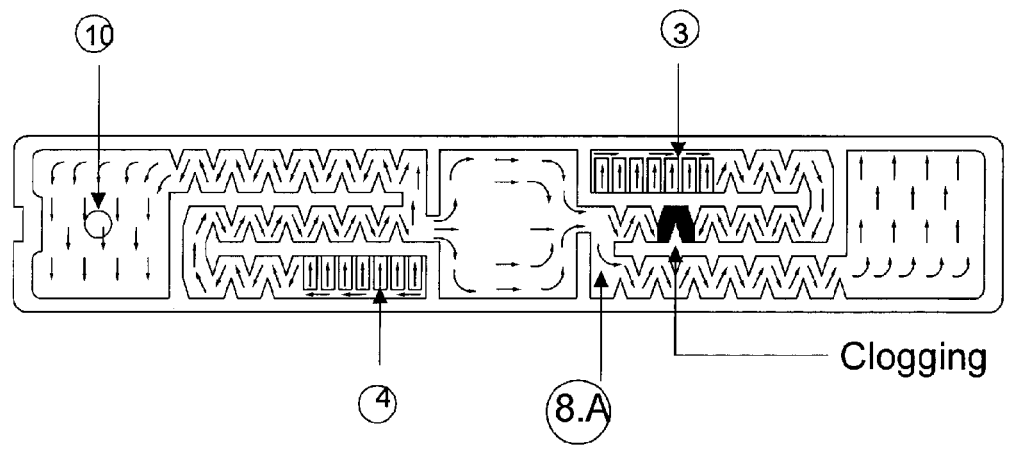
FIG. 6B & 6C: shows a perspective view of the non pressure compensated drip emitter in which 2 LPH of water is discharged under clogging condition.
Figure 6C:
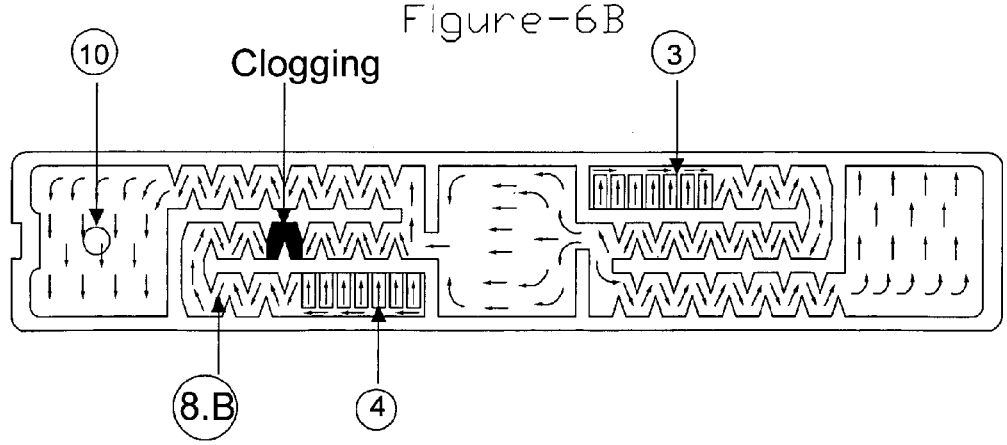

FIGS. 6B and 6C shows the 2 LPH water discharge under clogged condition in the common labyrinth. The water that enters the emitter also contains suspended soil particles which tend to get clogged into the labyrinth channel causing blockage in the water flow path. Here, labyrinth is divided into two parts though middle pool (6). Two entry points (3, 4) are provided for flowing water to be introduced into the emitter (1). The water coming from the first entry point (3) passes via filter (9A) to the $1^{st}$ partial labyrinth (8A) to the $2^{nd}$ partial labyrinth (8B) to the exit point (10). In any case if the first partial labyrinth (8A) gets clogged, still the water will get discharged at the same flow rate which is coming from the $2^{nd}$ entry point (4). And if the $2^{nd}$ partial labyrinth (8B) gets clogged, still the water will get discharged at the same flow rate which is coming from the $1^{st}$ entry point (3). Thus even in case of partial clogging of labyrinth, remaining partial labyrinth remain active and the emitter (1) will keep on giving same required discharge of water through the other entry point.

Figure 7A:
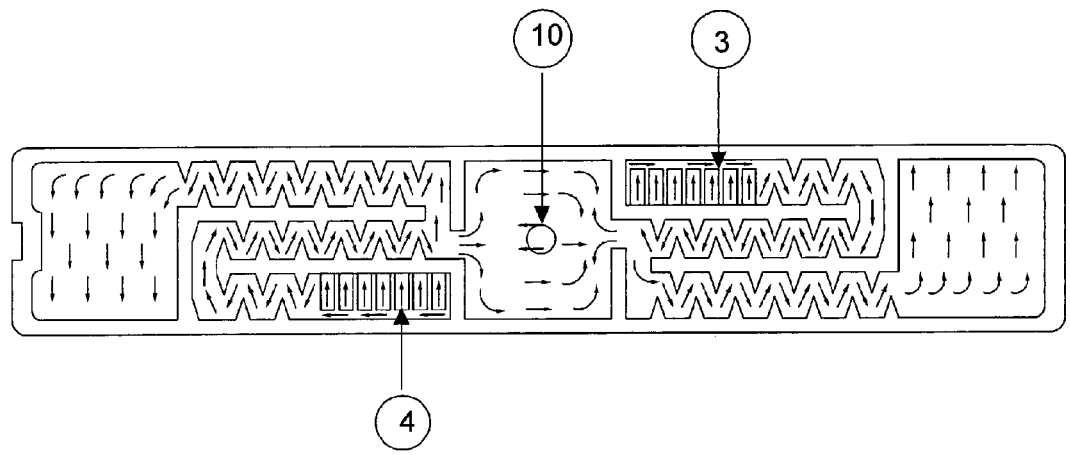
FIG. 7A: shows another view of the non pressure compensated drip emitter in which 4 LPH of water is discharged under normal condition.

FIG. 7A shows a diagram for 4 LPH water discharge under normal condition, in which water from the supply line enters the emitter (1) via two entry points (3, 4), passes into a common labyrinth (8A, 8B) through the respective filters (9A, 9B). The emitter (1) comprises of filters (9A, 9B) at each entry points (3, 4) which filter the coming water to the emitter thus minimizing clogging. The water coming from the filter further passes through the common labyrinth to the exit point (10). The common labyrinth comprise of zigzag water path (11) creates turbulence by virtue of vortex/whirlpool movement of water, entering from the tube at a pressure of around 1 kg, further minimizing the possibility of clogging to the least. The zigzag water path (11) of the said common labyrinth also reduces the pressure of the flowing water. The water comes out of middle pool (6) in droplets, at 4 LPH used for drip irrigation when middle pool (6) is punched. The drill in middle pool (6) and emitter pipe of the drip irrigation system is made as per the calculated water flow path to obtain 4 LPH discharge of flowing water. Here the drill is made so as to reduce (meet the required) the flowing water flow path as calculated to obtain 4 LPH discharge of flowing water.

Figure 7B:
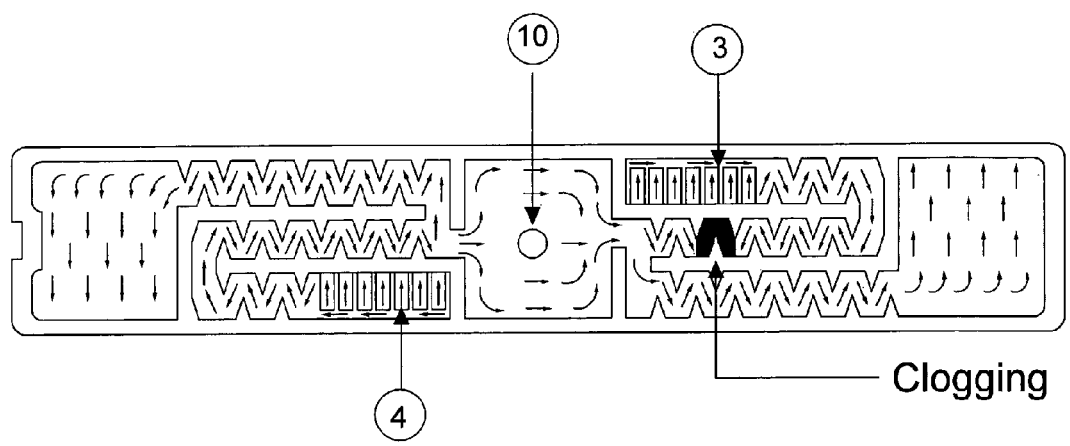
FIG. 7B: shows a perspective view of the non pressure compensated drip emitter in which 4 LPH of water is discharged under clogging condition.

FIG. 7B shows the 4 LPH water discharge under clogged condition in the common labyrinth. The water that enters the emitter (1) also contains suspended soil particles which tend to get clogged into the labyrinth channel causing blockage in the water flow path. Here, labyrinth is divided into two parts (8A, 8B) though middle pool (6). Two entry points (3, 4) are provided for flowing water to be introduced into the emitter. The water coming from the first entry point (3) passes via filter (9A) to the $1^{st}$ partial labyrinth (8A) to the $2^{nd}$ partial labyrinth (8B) to the exit point (10). In any case if the first partial labyrinth (8A) gets clogged, still the water will get discharged at the same flow rate which is coming from the $2^{nd}$ entry point (4). And if the $2^{nd}$ partial labyrinth (8B) gets clogged, still the water will get discharged at the same flow rate which is coming from the $1^{st}$ entry point (3). Thus even in case of partial clogging of labyrinth, remaining partial labyrinth will remain active and the emitter will keep on giving same required discharge of water through the other entry point.

Advantages of the Non Pressure Compensated Drip Irrigation Emitter of the Present Invention i. It transfers water from a pipe or tube to the area that is to be irrigated in a controlled manner and at the desired flow rate.

ii. It is less sensitive to clogging. In case of partial clogging of labyrinth, remaining partial labyrinth will come under activation and emitter will keep on giving same desired discharge.

iii. It facilitates to avoid double inventory because single emitter can produce different discharge emitting pipe thus supplier can save inventory carrying cost.

iv. It is made of a non-corrosive material and hence not affected by chemicals.

v. Its unique design provides smooth production of emitting pipe as there is no need of inserting emitters in given direction thus requires any additional precaution to monitor or regulate the direction of the emitter while installation.

vi. It ensures nominal loss of material as well as man-hours while its production thus amounts to significant extra earning out of savings on account of continuous production efficiency.

INDUSTRIAL APPLICABILITY

The non pressure compensated drip irrigation emitter with multiflow facility of the present invention ensures the proper control over the flow of water to the area that is to be irrigated. It has application in agriculture or horticulture industry. It can be used by farms, commercial greenhouses, and residential gardeners. It is adopted extensively in areas of acute water scarcity and especially for crops.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. Non pressure compensated drip emitter with multiflow facility, the drip emitter being placed inside a pipe of a drip irrigation system, the drip emitter comprising:
   a housing;
   at least two inlets through which water enter inside the emitter;
   a filter system being fitted at each inlet to ensure pure supply of water inside the emitter;
   three pools of water from only one of which water get discharged out of emitter and from emitter to the land to be irrigated via opening provided over periphery of the pipe of the drip irrigation system, the two pools out of three having the same capacity of discharging the water at a first flow rate and the said two pools are placed at the ends of the housing, the third pool is placed in the middle and having a capacity of discharging the water at a second flow rate, the second flow rate being greater than the first flow rate;
   a labyrinth in fluid communication with each pool and the filter system, the water entering through each inlet passes into labyrinth through respective filter system and from labyrinth to the outside of the pipe through one of the pool depending upon the selected flow rate of water, the labyrinth comprises a plurality of zigzag water paths;
   wherein the labyrinth connects middle pool with remaining two pools through the zigzag water path in such a way that even in case of partial clogging of the zigzag water path, the remaining partial zigzag water path remain active and ensure the discharge of water at a selected flow rate from the emitter.

2. The non pressure compensated drip emitter with multiflow facility as claimed in claim 1 wherein each pool comprises an opening depending upon discharge flow rate and the said opening of the pool is eccentric with the opening provided over periphery of the pipe of the drip irrigation system.

3. The non pressure compensated drip emitter with multi flow facility as claimed in claim 1 wherein emitter is placed inline inside the pipe of drip irrigation system.

4. The non pressure compensated drip emitter with multi flow facility as claimed in claim 1 wherein emitter is welded with inner wall of the pipe of the drip irrigation system.

5. The non pressure compensated drip emitter with multiflow facility as claimed in claim 1 wherein first flow rate is 2 LPH and second flow rate is 4 LPH.

6. The non pressure compensated drip emitter with multi-flow facility as claimed in claim 1 wherein first flow rate is 4 LPH and second flow rate is 8 LPH.

7. The non pressure compensated drip emitter with multi-flow facility as claimed in claim 1 wherein the said emitters is designed in such a way that it could be inserted either way during production.

* * * * *